(12) United States Patent
Bechhofer et al.

(10) Patent No.: US 7,305,351 B1
(45) Date of Patent: Dec. 4, 2007

(54) SYSTEM AND METHOD FOR MANAGING RISK AND OPPORTUNITY

(75) Inventors: Steven Bechhofer, Münich (DE);
Bernd Collmer, Höhenkirchen-Siegertsbrunn (DE);
Edgar Wittman, Gauting (DE);
Michael Pfennig, Mühlheim (DE);
Achim Haug, Münich (DE)

(73) Assignee: Qimonda AG, Neubiberg (DE)

( * ) Notice: Subject to any disclaimer, the term of this patent is extended or adjusted under 35 U.S.C. 154(b) by 715 days.

(21) Appl. No.: 09/680,923

(22) Filed: Oct. 6, 2000

Related U.S. Application Data (60) Provisional application No. 60/238,416, filed on Oct. 6, 2000.

(51) Int. Cl.
*G06F 9/44* (2006.01)
(52) U.S. Cl. .......................................................... 705/7
(58) Field of Classification Search ...................... 705/7
See application file for complete search history.

(56) References Cited

U.S. PATENT DOCUMENTS

| | | |
|---|---|---|
| 5,101,362 A | 3/1992 | Simoudis |
| 5,189,608 A | 2/1993 | Lyons et al. |
| 5,406,477 A | 4/1995 | Harhen |
| 5,448,722 A | 9/1995 | Lynne et al. |
| 5,506,999 A | 4/1996 | Skillman et al. |
| 5,586,252 A | 12/1996 | Barnard et al. |
| 5,608,620 A | 3/1997 | Lundgren |
| 5,644,727 A | 7/1997 | Atkins |
| 5,842,193 A | 11/1998 | Reilly |
| 5,884,287 A | 3/1999 | Edesess |
| 5,930,762 A | 7/1999 | Masch |

(Continued)

FOREIGN PATENT DOCUMENTS

JP 7-319970 A * 12/1995

(Continued)

OTHER PUBLICATIONS

U.S. Appl. No. 60/226,576.*

(Continued)

*Primary Examiner*—Susanna M. Diaz
(74) *Attorney, Agent, or Firm*—Fay Kaplun & Marcin, LLP (57) ABSTRACT

A method of projecting a future condition of a business entity by identifying a plurality of risks and a plurality of opportunities for the business entity and evaluating at predetermined times a potential impact of each of the risks and each of the opportunities on the future condition of the business entity. Determining at each of the predetermined times for each of the risks one of a probability that the risk will come to pass during a predetermined period of time and a frequency at which the risk will come to pass and determining at each of the predetermined times for each of the opportunities one of a probability that the opportunity will become available to the business entity during a predetermined period of time and a frequency at which the opportunity will become available to the business entity. Projecting at each of the predetermined times the future condition of the business entity based on the potential impact of each of the risks and opportunities and based on the determinations with respect to the one of frequency and probability for each of the risks and opportunities.

14 Claims, 7 Drawing Sheets

350

| 351 | 352 | 353 | 354 | 355 | 356 | 357 |
|---|---|---|---|---|---|---|
| General Business risks/opportunities | Operations management risks/opportunities | Financial risks/opportunities | Information technology (IT) risks/opportunities | Purchasing risks/opportunities | Legal and compliance risks/opportunities | Human resources risks/opportunities |
| For example: | For example: | For example: | For example: | For example: | For example: | For example: |
| ○ market cycle | ○ development-time to market | ○ currency fluctuations | ○ loss of use of IT | ○ dependency risks | ○ product liability | ○ recruiting of key personnel |
| ○ competitor behaviour | ○ cycle time in manufacturing | ○ country risk | ○ misuse of IT | ○ supplier market place | ○ contractual risks | ○ labour market |
| ○ technological innovation pressure | ○ manufacturing process stability | ○ credit management | ○ IT development | ○ purchase/ commodity price | ○ environmental risk | ○ reward system |
| ○ Merger and Aquisition activities | ○ quality in development/ manufacturing | ○ interest income | ○ IT implementation | ○ purchasing logistics | ○ intellectual property | ○ co-operation/ leadership |
| | | | | | ○ competition law | |

U.S. PATENT DOCUMENTS

| | | | |
|---|---|---|---|
| 5,970,479 A | 10/1999 | Shepherd | |
| 5,991,743 A | 11/1999 | Irving et al. | |
| 6,018,714 A * | 1/2000 | Risen et al. | 705/4 |
| 6,021,402 A | 2/2000 | Takriti | |
| 6,067,486 A | 5/2000 | Aragones et al. | |
| 6,161,101 A * | 12/2000 | Guinta et al. | 706/45 |
| 6,223,143 B1 * | 4/2001 | Weinstock et al. | 703/17 |
| 6,912,502 B1 * | 6/2005 | Buddle et al. | 705/1 |
| 2001/0027389 A1 * | 10/2001 | Beverina et al. | 703/22 |
| 2002/0049621 A1 * | 4/2002 | Bruce | 705/7 |
| 2002/0059093 A1 * | 5/2002 | Barton et al. | 705/10 |
| 2004/0059627 A1 * | 3/2004 | Baseman et al. | 705/10 |

FOREIGN PATENT DOCUMENTS

JP  1-1134396  5/1999

OTHER PUBLICATIONS

Rebane, Kirk A. "Determining Worth in the Consolidation Era." National Home Center News ProDealer Supplement, p. 14+, Jan. 10, 2000.*

Daniell, Mark Haynes. "Strategy and Volatility: Risk and Global Strategic Challenge." Balance Sheet, vol. 8, No. 4, pp. 24-36, 2000 (excerpt from author's book published Mar. 2000).*

Graham et al. "How Much Capital is Enough?" Credit Union Management, vol. 18, No. 2, pp. 42-46, Feb. 1995.*

Motta et al. "Investment and Risk Analysis Applied to the Petroleum Industry." SPE—Asia Pacific Oil and Gas Conference 2000, 2000.*

Park et al. "Exploiting Uncertainty—Investment Opportunities as Real Options: A New Way of Thinking in Engineering Economics." Engineering Economist, vol. 45, No. 1, p. 1, Spring 2000.*

Schuyler et al. "Simulation Demonstrates Economics of Minnelusa Polymer Floods." Oil & Gas Journal, vol. 89, No. 21, p. 90, May 27, 1991.*

Mudford, B.S. "Valuing and Comparing Oil and Gas Opportunities: A Comparison of Decision Tree and Simulation Methodologies." Proceedings - SPE Annual Technical Conference and Exhibition, 2000.*

Wood, David A. "Intergrated Approach to Property Evaluation Improves Decision-Making for Both Parties." Oil & Gas Journal, vol. 97, No. 44, pp. 49-53, Nov. 1, 1999.*

Schuyler, John R. "Modeling an Exploration Program: Insensitivity to Prospect Ranking Criteria." Oil and Gas Journal, vol. 87, No. 52, p. 140(3), Dec. 25, 1989.*

* cited by examiner

Description of the regarded risk/opportunity categories

210
- Please indicate in the first column of the following list those risk/opportunity areas which belong to or which can usually occur within the regarded risk/opportunity category.
- In the second column please indicate the five risk/opportunity areas which are the most essential.
- Then please mark those risk/opportunity areas in the last column you have a responsibility for within the risk/opportunity management system.

220

| Financial Risks/Opportunities | 241 Possible risks/opportunities | 242 5 most essential risks/opportunities | 243 Responsibility |
|---|---|---|---|
| Currency fluctuations—221 | ☐ | ☐ | ☐ |
| Interest rate fluctuations—222 | ☐ | ☐ | ☐ |
| Credit Management—223 | ☐ | ☐ | ☐ |
| Credit Risks toward lenders—224 | ☐ | ☐ | ☐ |
| Country Risks—225 | ☐ | ☐ | ☐ |
| Interest Income—226 | ☐ | ☐ | ☐ |
| Short term liquidity risks—227 | ☐ | ☐ | ☐ |
| Long term liquidity risks—228 | ☐ | ☐ | ☐ |

230
- If there are other possible or essential risk/opportunity areas within the category please indicate:

| Risk/Opportunity | Possible risks/opportunities | 5 most essential risks/opportunities | Responsibility |
|---|---|---|---|
| __________ | ☐ | ☐ | ☐ |
| __________ | ☐ | ☐ | ☐ |
| __________ | ☐ | ☐ | ☐ |
| __________ | ☐ | ☐ | ☐ |

| General Business risks/ opportunities | Operations management risks/opportunities | Financial risks/ opportunities | Information technology (IT) risks/ opportunities | Purchasing risks/ opportunities | Legal and compliance risks/ opportunities | Human resources risks/opportunities |
|---|---|---|---|---|---|---|
| For example: <br>○ market cycle <br>○ competitor behaviour <br>○ technological innovation pressure <br>○ Merger and Aquisition activities | For example: <br>○ development-time to market <br>○ cycle time in manufacturing <br>○ manufacturing process stability <br>○ quality in development/ manufacturing | For example: <br>○ currency fluctuations <br>○ country risk <br>○ credit management <br>○ interest income | For example: <br>○ loss of use of IT <br>○ misuse of IT <br>○ IT development <br>○ IT implementation | For example: <br>○ dependency risks <br>○ supplier market place <br>○ purchase/ commodity price <br>○ purchasing logistics | For example: <br>○ product liability <br>○ contractual risks <br>○ environmental risk <br>○ intellectual property <br>○ competition law | For example: <br>○ recruiting of key personnel <br>○ labour market <br>○ reward system <br>○ co-operation/ leadership |

SYSTEM AND METHOD FOR MANAGING RISK AND OPPORTUNITY

INCORPORATION BY REFERENCE

U.S. Provisional Patent Application 60/238,416 filed on Oct. 6, 2000 and entitled "A System and Method for Managing Risk and Opportunity" to the same inventors named in the present application is incorporated hereby, in its entirety, by reference.

BACKGROUND INFORMATION

Businesses, whether they are large multinational corporations or locally owned single proprietorships, operate in a business environment characterized by an ever increasing number of risks that arise in the ordinary course of business. These risks arise from such factors as the increasing globalization of markets, intensifying competition and the development and use of new and complex technologies. Such risks are inevitable, because most businesses cannot engage in any meaningful form of commerce without accepting these risks.

There are a variety of factors, both internal and external, which in combination make it important for corporations to implement a structured approach to managing risk. The factors may include both commercial realities, legal requirements and other non-commercial factors. Commercial realities may include, for example, global competition for capital which means that one goal of the officers and directors of a business is to increase shareholder value to enhance the appeal of the corporation to current and potential investors, thereby fueling growth. Other commercial realities include the globalization of markets which results in increased competition and more complex and substantial risks, where each local market within the global economy may create risks unique to that market. Additionally, the rapid changing and evolution of markets, including new competitors, new technologies, new customer requirements, the compression of response times, and the increased use of outsourcing add to the risks and the complexities of these risks faced by modern business entities.

In certain jurisdictions throughout the world, business entities are required by law to ensure that there is an appropriate system in place to handle risk management. Also, other entities such as insurance companies and capital investment firms may require that a business entity identify and manage risks before they will indemnify or infuse capital into the business entity. A final example of another entity that may require a structured risk management program is a potential long term customer. For example, before signing a long term purchase contract, the customer may want assurances that the supplier business entity will be able to fulfill the entirety of the contract. One manner of providing those assurances may be to show a structured approach to handling risk and dealing with consequences.

SUMMARY OF THE INVENTION

A method of projecting a future condition of a business entity, comprising the steps of identifying a plurality of risks and a plurality of opportunities for the business entity. Evaluating at predetermined times a potential impact of each of the risks and each of the opportunities on the future condition of the business entity and determining at each of the predetermined times for each of the risks one of a probability that the risk will come to pass during a predetermined period of time and a frequency at which the risk will come to pass. Also, determining at each of the predetermined times for each of the opportunities one of a probability that the opportunity will become available to the business entity during a predetermined period of time and a frequency at which the opportunity will become available to the business entity. Projecting at each of the predetermined times the future condition of the business entity based on the potential impact of each of the risks and opportunities and based on the determinations with respect to the one of frequency and probability for each of the risks and opportunities.

DETAILED DESCRIPTION

The present invention may be further understood with reference to the following description and the appended drawings, wherein like elements are provided with the same reference numerals. In describing the exemplary embodiments of the present invention, the specification generally refers to the entities engaging in business and commerce as corporations. Examples of entities, other than corporations, that engage in commercial transactions include partnerships, sole proprietorships, etc. Those skilled in the art will understand that the present invention may be implemented by any "for-profit" entity, as well as charities, foundations, non-profit organizations, etc.

Figure 1:
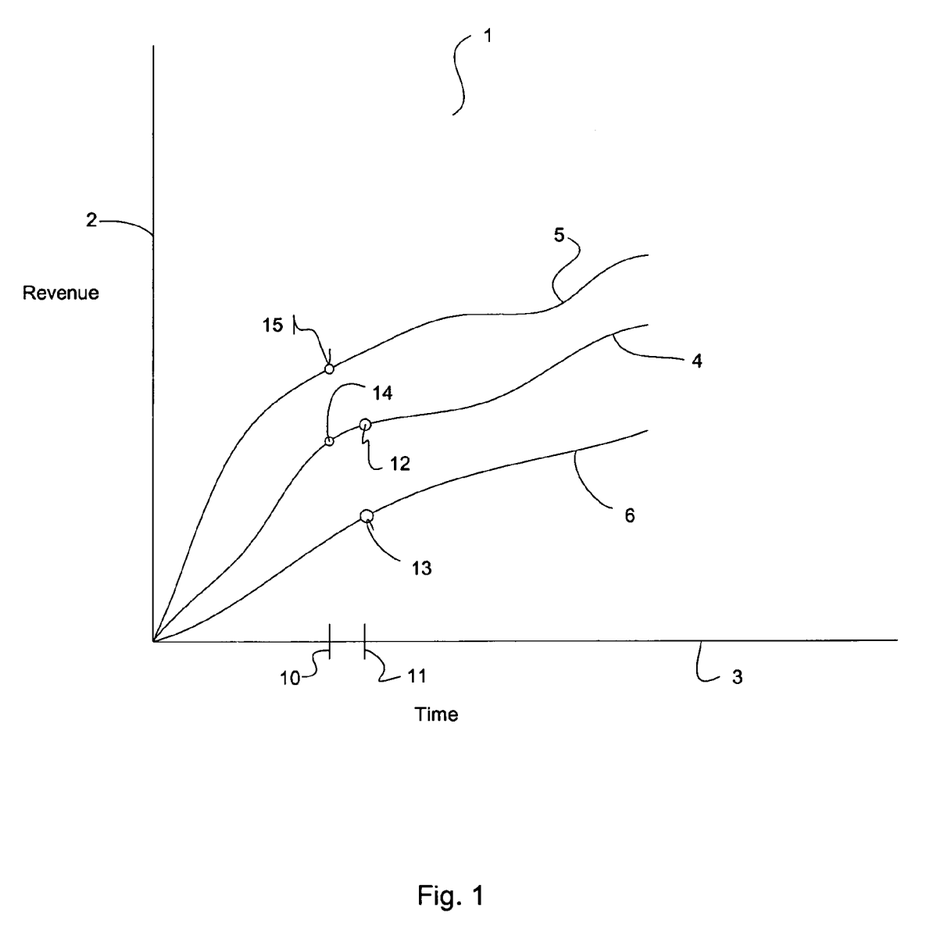
FIG. 1 shows an exemplary revenue forecast.

FIG. 1 shows an exemplary revenue forecast chart 1 for a corporation. Expected revenue 2 is charted against time 3 resulting in exemplary revenue curve 4. However, there are factors that can move the revenue forecast in either the positive or the negative direction. Positive changes may result in the revenue forecast being revised up to exemplary revenue curve 5, while negative changes may result in the revenue forecast being revised down to exemplary revenue curve 6. The negative effects, which may be termed "risks," are dangers that events, acts or omissions may obstruct a corporation in the achievement of its objectives or the successful implementation of its strategies. Risk includes all these events, internal or external to the corporation, that have the potential to threaten the success of the company, and is not limited to unexpected negative developments. For example in FIG. 1, at time 11 the forecast is for revenue 12. However, because of potential risks, there may only be actual revenue 13 at time 11. The positive effects in the revenue forecast may be termed "opportunities." An opportunity is the potential that an option which may help the corporation to achieve its objectives or its strategic goals may be available in the future. For example in FIG. 1, at time 10 the forecast is for revenue 14. However, because of potential opportunities, there may be actual revenue 15 at time 10. Those skilled in the art will understand that the quantification of risks and opportunities is not limited to revenue forecasts, but can be applied to other monetary forecasts, for example, earnings, sales, etc., and non-monetary forecasts, for example, market share, number of employees, new technologies, new applications, new product/process developments, etc.

The managing of these risks and opportunities will be referred to as risk/opportunity management. Additionally, throughout this description the terms risk and opportunity may be used singularly. However it should be understood that unless specifically referred to as applying to risk or opportunity only, these terms refer herein to both risks and opportunities. The processes and functions described herein for managing risk may be equally applied to the management of opportunities. Risk/opportunity management includes the activities and measures associated with the identification, evaluation and handling of risks and opportunities. Risk/opportunity management is not aimed at removing all risks, but rather at identifying and developing opportunities while assessing the risks encountered in the normal course of business. An integrated and clearly structured risk/opportunity management framework can help support the maximization of equity values in a corporation. Such a structured system includes, for example, clear roles defining responsibilities and expectations for managing risks and opportunities to maintain risk at a desired level, early risk/opportunity identification to allow early and effective decisions, an effective and efficient process and/or processes for identifying risks, a focus on key opportunities and risks, identification of risk accumulations and risk escalations in a particular sector or business unit, and the improvement of risk awareness. However, each individual corporation should focus its risk/opportunity management structure based on its business strategies and goals. For example, a multinational automobile company most likely has strategies and goals different from those of a local service industry business, or even a multinational semiconductor company. Thus, risk/opportunity management is not self-serving, but should be part of a company wide solution to optimize the risk-return relationship.

A risk/opportunity management system may be tailored to reflect the unique characteristics of an individual organization, but there may be some common fundamental elements that form the foundation of a comprehensive risk/opportunity management system. These elements may include, risk/opportunity management policies and guidelines, a risk/opportunity management organization, a well-defined risk/opportunity management process and risk/opportunity culture and communication. Each of these elements will be described in greater detail below along with supporting instruments and tools, which include risk/opportunity identification, risk/opportunity categorization, risk/opportunity evaluation and risk/opportunity analysis.

Risk/Opportunity Management Policy and Guidelines: The formulation and authorization of a risk/opportunity management policy at the corporate level illustrates management's commitment to implement and continuously develop risk/opportunity management within the corporate organization. The policy should set out the objectives and elements of risk/opportunity management within the organization and assists in promoting risk/opportunity awareness among employees and integrating risk/opportunity management in the corporate culture. Also, corporate management based on its knowledge and understanding of the corporation's strategies and goals, should formulate risk/opportunity management policies in a manner designed to accomplish these specific goals. A risk/opportunity policy will include, for example, the corporation's objectives and strategy for handling risk/opportunity, general requirements for risk/opportunity management and the general organizational structure for the management of risk/opportunity and the various parties' responsibilities within the organizational structure. The corporate risk/opportunity policy may be implemented via a series of detailed policies and guidelines for different risk/opportunity areas or regarding specific risk/opportunity management strategies.

Figure 2A:
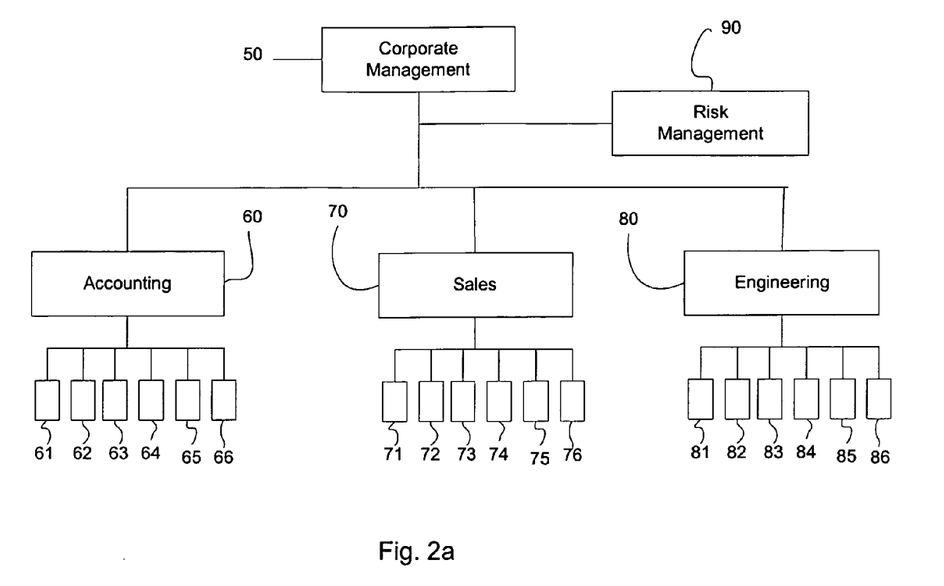
FIG. 2a shows an exemplary organizational structure for implementing a risk/opportunity management scheme on a corporate function level at an exemplary corporate entity.

FIG. 2a, for example, shows an exemplary organizational structure for implementing a risk/opportunity management scheme at an exemplary corporate entity. In this exemplary corporation, corporate management 50 has formulated a risk/opportunity management scheme that is focused on corporate functions, for example, accounting 60, sales 70 and engineering 80. Those skilled in the art will understand that the risk/opportunity management organizational scheme is not limited corporate functions, but may be organized along any line best suited for a particular organization, for example, business unit, division, product line, etc. Corporate management 50 may define the policies and guidelines for each of the corporate functions 60-80 to compliment long term corporate strategy. Corporate management 50 may, for example, state that the engineering function 80 is responsible for risks/opportunities associated with lead times for designs, with the procurement of raw materials and with capital projects. Similarly, the accounting function 60 and sales function 70 may be assigned responsibility for risks/opportunities most closely associated with those functions. Along with assigning risks/opportunities to each of the particular corporate functions 60-80, corporate management 50 may also assign to each of corporate functions 60-80 the goals and objectives they should accomplish with their risk/opportunity management scheme.

In general, corporate management 50 will set overall policy and guidelines for each of corporate functions 60-80, but will leave the responsibility for implementing these policies to the individual corporate functions 60-80. For example, each of corporate functions 60-80 may implement a series of specific and detailed policies to implement the overall policy assigned to that function by corporate management 50. Accounting function 60 may implement specific policies 61-66, sales function 70 may implement specific policies 71-76 and engineering function 80 may implement specific policies 81-86. To follow through with the example above, specific policy 81 of engineering function 80 may be to implement a risk/opportunity management policy for design lead times, specific policy 82 may be to implement a risk/opportunity management policy for raw material procurement and specific policy 83 may be to implement a risk/opportunity management policy for capital projects. There may also be any number of sub-policies or guidelines within each of these specific policies that are needed to fully implement the goals proscribed by corporate management 50. The specific policies implemented by corporate functions 60-80 or the overall corporate policies formulated by corporate management 50 may be written, but there is no specific requirement that the policies be written, they may be communicated by any means to the individuals responsible for carrying out the risk/opportunity management policy.

Figure 2B:
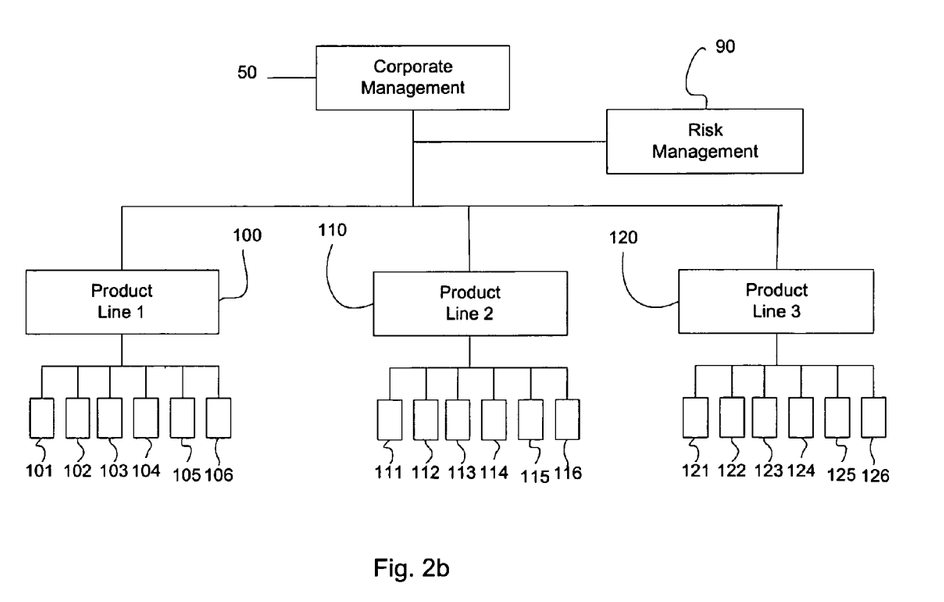
FIG. 2b shows an exemplary organizational structure for implementing a risk/opportunity management scheme on a product line basis at an exemplary corporate entity.

FIG. 2b shows an exemplary organizational structure for implementing a risk/opportunity management scheme at an exemplary corporate entity. In this exemplary corporation, corporate management 50 has formulated a risk/opportunity management scheme focused on product lines: for example, product line A 100, product line B 110 and product line C 120.

Similar to the description above for FIG. 2a, corporate management 50 may define the policies and guidelines for each of the product lines 100-120 to compliment long term corporate strategy. Meanwhile, each of individual product lines 100-120 may implement a series of specific and detailed policies to implement the overall policy assigned to that product line by corporate management 50. For example, product line A 100 may implement specific policies 101-106 to accomplish the risk/opportunity management goals it is assigned by corporate management 50.

Risk/Opportunity Management Organization: In FIG. 2a, risk/opportunity management organization 90 is interposed between corporate functions 60-80 and corporate management 50. In this exemplary structure, each of corporate functions 60-80 report to risk/opportunity management organization 90 which acts as a buffer or filter for corporate management 50. Risk/opportunity management organization 90 is responsible for reporting risk/opportunity to corporate management 50 for the entire organization. In some instances, risk/opportunity management organization 90 may be distributed throughout the organization in each of corporate functions 60-80, or in some cases, a group that performs the function of risk/opportunity management organization 90 may be centrally located, physically and/or organizationally.

The role of risk/opportunity management organization 90 may include review of the risk/opportunity management responsibilities of each of corporate function 60-80 to determine that the responsibility corresponds to the business responsibilities of each function. For example, sales function 70 may have been initially assigned the responsibility for managing risk/opportunity associated with the collection of payments from customers because the sales organization made the sales and has the most contact with customers. However, in the business structure of the organization, accounting function 60 may be responsible for collections, and therefore, the responsibility for risk/opportunity related to this may be more properly suited to accounting function 60. Risk/opportunity management organization 90, with the approval of corporate management 50, may be responsible for reallocating such a risk/opportunity responsibility. Similarly, risk/opportunity management organization 90 may also be responsible for the avoidance of inefficiencies in the risk/opportunity management responsibilities including the avoidance of gaps and overlaps in the risk/opportunity management responsibilities across the entire organization. For example, risk/opportunity management organization 90 may be tasked with identifying all areas of risk/opportunity within the organization and assuring that the responsibility for each of these areas is assigned to one, and only one, of corporate functions 60-80. Likewise, it may be the responsibility of risk/opportunity management organization 90 to resolve disputes among corporate functions 60-80 as to areas of risk/opportunity responsibility.

Risk/opportunity management organization 90 may also be tasked with the reporting of risks and opportunities to corporate management 50. To provide meaningful reports, risk/opportunity management organization 90 must ensure that each of corporate functions 60-80 records and reports their risks and opportunities in a uniform manner so that each individual report may be combined into a comprehensive report detailing the risks and opportunities for the entire organization. Risk/opportunity management organization 90 may also be assigned the task of corporate training for risk/opportunity management. Such training may be used to ensure that the optimum approach to risk/opportunity identification, handling and control processes are used throughout the organization. This does not mean that each of corporate functions 60-80 use the same risk/opportunity identification, handling and control processes, just that the most optimum processes for each function are used. The manner in which risk/opportunity management organization may accomplish such a task may be through the review of each of the specific policies implemented by corporate functions 60-80, for example, specific policies 61-66. Through such a review, risk/opportunity management organization 90 may identify potential problems in the policy and recommend solutions to these problems. These reviews may also identify unique solutions to risk/opportunity management that may be implemented throughout the organization. Finally, these reviews may also be used to accomplish the goal of uniform reporting by each of corporate functions 60-80.

Risk/Opportunity Management Process: The objective of the risk/opportunity management process is to identify and evaluate risks/opportunities, handle and monitor these risks/opportunities efficiently and ensure ongoing risk/opportunity reporting for informed decision making. The risk/opportunity management process embraces the whole spectrum of activities and measures concerned with the systematic management of risk/opportunity within the corporation. The overall objective of the risk/opportunity management process is to optimize the risk-return relationship, to eliminate unacceptable risks and capitalize on worthwhile opportunities.

Figure 3:
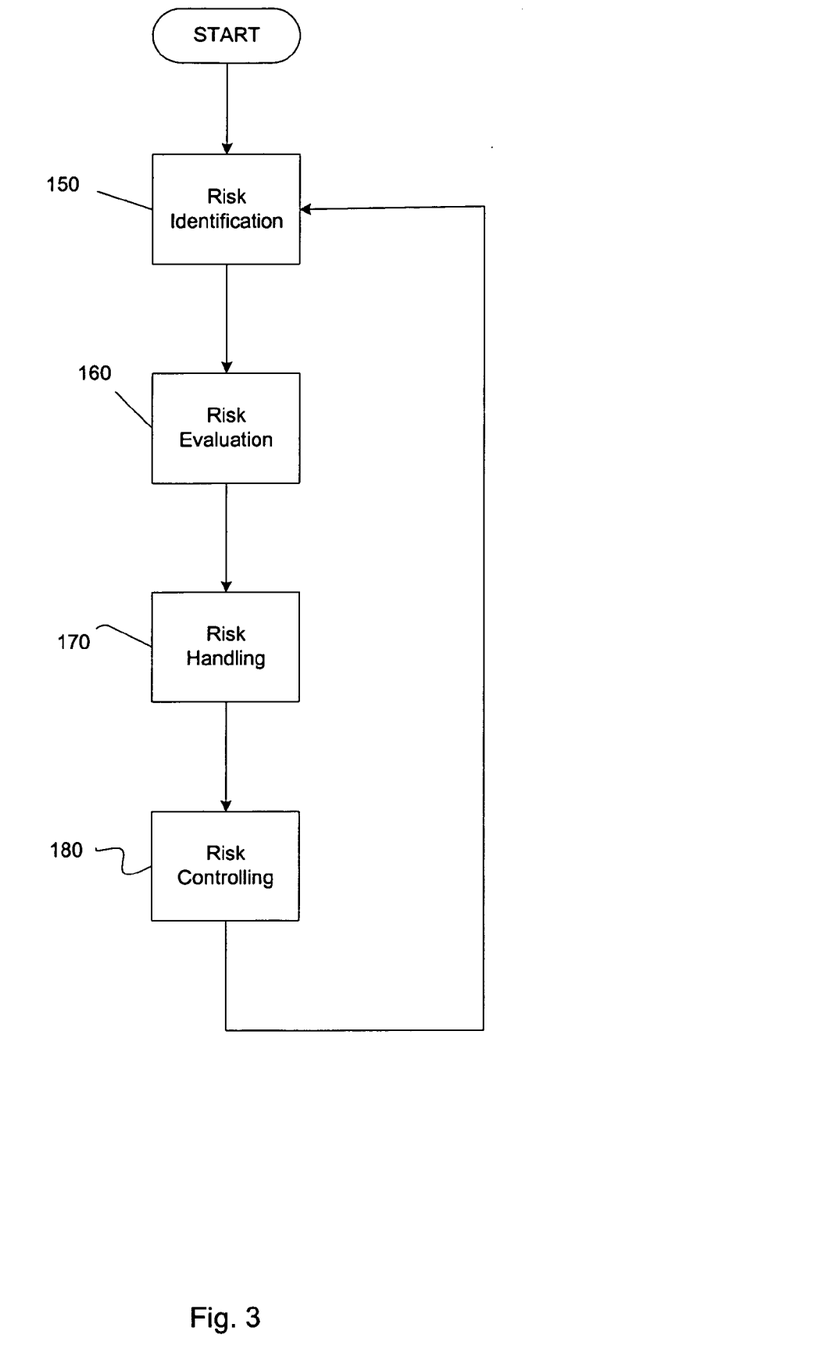
FIG. 3 shows an exemplary process for risk and opportunity management.

FIG. 3 shows an exemplary process for a risk/opportunity management system. In step 150, risks/opportunities are systematically identified. There are numerous methods that may be employed to systematically identify risks/opportunities that may be used alone or in conjunction to assist the risk/opportunity identification process. These methods include, for example, checklists, structured interviews, workshops, questionnaires, surveys, evaluation of planning and control documents and the analysis of flow charts. In addition to risk/opportunity identification, the root causes of such risks/opportunities may also identified so that the risk/opportunity may be properly evaluated in later steps. One of the keys to exploiting the information generated by a risk/opportunity management system is the timely identification of risks/opportunities. Therefore, risk/opportunity identification step 150 should be an ongoing process that occurs on a regular basis. For example, risk/opportunity identification step 150 may be performed on a weekly, monthly or quarterly basis.

In order to effectively identify all risks/opportunities faced by the business, the risk/opportunity universe may be broken down into several manageable risk/opportunity categories. Risk/opportunity may be categorized as causes, events, impacts and strategies. A cause may be, for example, an unstable manufacturing process. An event may be, for example, a regional crisis, environmental catastrophe or a strike. Impacts may be on, for example, assets, earnings, cash flow and reputation. Finally, strategies may be, for example, insurance for suitable risks. A risk/opportunity categorization model based on causes may be effective because it makes the management and control of risks effective by identifying root causes which allow treatment before the causes turn into symptoms. It also helps to identify risk/opportunity owners and assign responsibilities for risk/opportunity management and thus provides a basis for monitoring compliance with the risk/opportunity management responsibilities. Such a categorization model also assists in the identification of areas of accumulations and escalations of risk/opportunity arising from a single cause. The model selected, whatever it may be, should be designed to allow a generic approach applicable to all different kinds of business, allow the creation of comprehensive checklists and/or questionnaires containing all risks/opportunities faced by the corporation, supply a basis for consistent terminology to avoid ambiguity and support the identification of risk/opportunity owners and the allocation of roles and responsibilities within the risk/opportunity management process.

Figure 7:
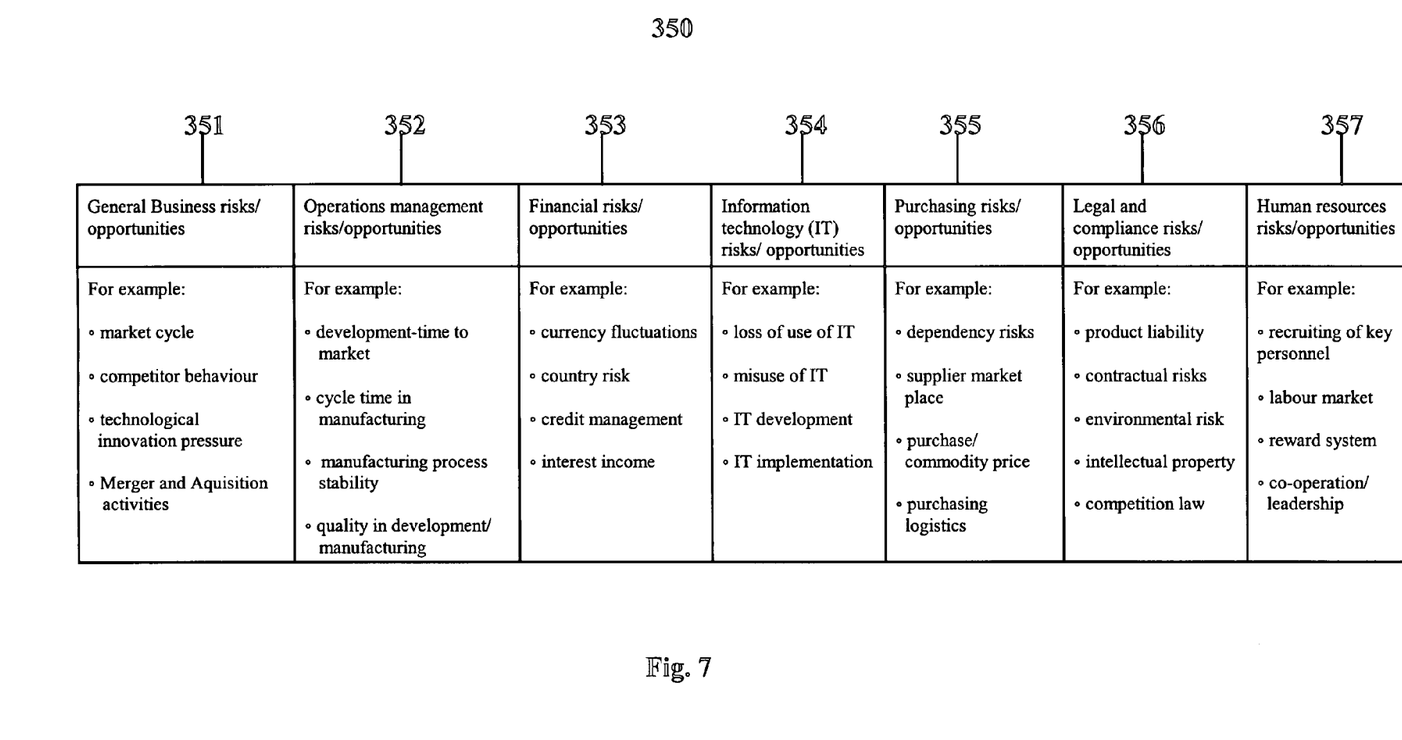
FIG. 7 shows an exemplary risk and opportunity categorization model having multiple risk/opportunity categories and sample risk/opportunity areas.

FIG. 7 shows exemplary risk/opportunity categorization model 350 having multiple risk/opportunity categories 351-357 and sample risk/opportunity areas The exemplary risk/opportunity categories illustrated in FIG. 7 include general business risks/opportunities 351, operations management risks/opportunities 352, financial risks/opportunities 353, information technology risks/opportunities 354, purchasing risks/opportunities 355, legal and compliance risks/opportunities 356, and human resources risks/opportunities 357. Each of risk/opportunity categories 351-357 may be defined to ensure common terminology throughout the corporation and consistency in the application of the standard risk/opportunity categorization model. Those skilled in the art will understand that each of the exemplary risk/opportunity categories 351-357 may be further sub-categorized to more narrow areas of focus. For example, general business risks/opportunities 351 may have subcategories of market/industry risks/opportunities and business management risks/opportunities. Similarly, operations management risks/opportunities may have subcategories of technology and product development risks/opportunities and manufacturing and logistics risks/opportunities.

General business risks/opportunities 351 are changes to the external environment or changes made to the business strategy in response to this external environment, which alter the ability to continue to provide target performance, for example, market cycles and competitor behavior. A risk associated with market cycles may be an unexpected or excessive drop in the demand for a product, while an opportunity associated with market cycles may be an increase in demand for a product. Similarly, operations management risks/opportunities 352 are risks/opportunities within the value chain process or the supporting process, for example, manufacturing process stability. Likewise, each of remaining risk/opportunity categories 353-357 have associated risks/opportunities as shown by the exemplary risks/opportunities illustrated in FIG. 7. Those skilled in the art will understand that every risk may not have a corresponding opportunity and vice versa. For example, in financial risks/opportunities 353, interest income is an opportunity, but there is no corresponding risk to the opportunity of interest income. In information technology risks/opportunities 354, there may be a risk of the misuse of information systems, but there are no opportunities associated with this risk.

Figure 4:
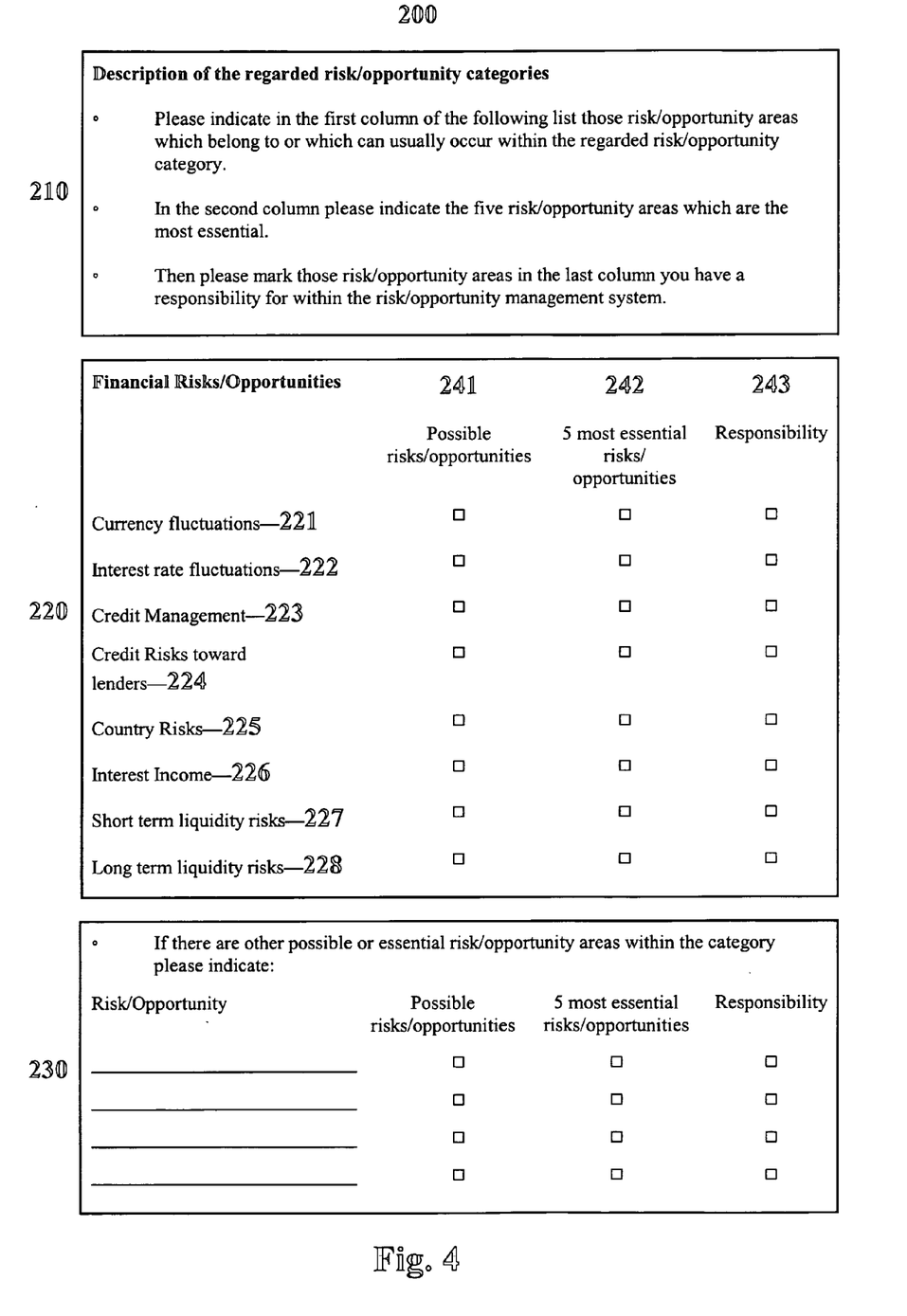
FIG. 4 shows an exemplary checklist for the identification of risks in an exemplary risk and opportunity management process.

FIG. 4 shows an example of a checklist 200 that may be used to identify risks/opportunities in risk/opportunity identification step 150. Exemplary checklist 200 is aimed at the identification of financial risks/opportunities. However, those skilled in the art will understand that such checklists may be generated for any area where risks and opportunities are present. Exemplary checklist 200 is separated into three main areas, instructions 210, risk/opportunity categories 220 and other risks/opportunities 230. Instructions 210 are self explanatory and indicate how the individual should fill out checklist 200. Risk/opportunity categories 220 list a number of risks/opportunities 221-228 that are subcategories of financial risks/opportunities. For example, credit management 223 may be both a risk and an opportunity, while country risks 225 may only be a risk. Risk/opportunity categories 220 also has three columns 241-243 for the identification of risks/opportunities. In filling out column 241, the individual will check each of risks/opportunities 221-228 that apply to their area. For example, if currency fluctuations 221 are a risk/opportunity for the particular entity filling out checklist 200 that line would be checked in column 241. In column 242, the individual is instructed to indicate which of risks/opportunities 221-228 are most essential to the area within this risk/opportunity category, financial risks/opportunities. In this exemplary embodiment, the responsible individual is to indicate the five risk/opportunity areas that are most essential to the area. It may be that financial risks/opportunities are not essential to the responsible individuals area and therefore, none of the boxes in column 242 may be checked. For example, the individual may be filling out all the risk/opportunity checklists for a product line and in this particular product line financial risks/opportunities are not essential, but purchasing risks/opportunities are essential. Therefore, for example, three out the five most essential risks/opportunities may be identified in the purchasing checklist. Finally, in column 243, the individual is requested to check those of risks/opportunities 221-228 for which they have a responsibility. Other risks/opportunities 230 is essentially the same as risk/opportunity categories 220 except that the individual has an opportunity to add additional risks/opportunities that are not specifically listed in risk/opportunity categories 220. Exemplary checklist 200 may be followed-up with an interview by risk/opportunity management organization 90 to identify the root causes of the risks/opportunities identified by checklist 200 and also to determine if additional risks/opportunities identified in other risks/opportunities 230 should be permanently added to checklist 200. Those skilled in the art will understand that risks/opportunities which have their source in financial transactions may be more readily identified and subsequently evaluated through an analysis of accounting and other transaction related records, rather than through the use of a checklist.

Figure 5:
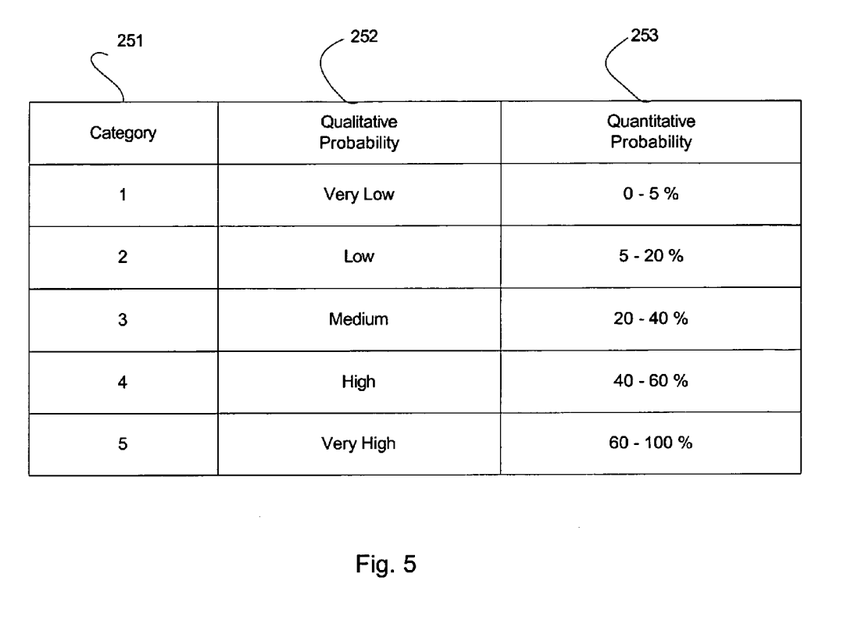
FIG. 5 shows an exemplary risk/opportunity table for quantifying the potential frequency of a risk or opportunity coming to pass.

Returning to FIG. 3, the risk/opportunity management process then continues to step 160 where the risk/opportunity is evaluated. Risk/opportunity evaluation includes quantifying the impact of the various risks/opportunities to determine the potential severity/advantage and the probability of each of these risks/opportunities occurring. From this, the potential frequency of each risk and opportunity is determined. One of the objectives of step 160 is to measure the relative importance of risks/opportunities to enable decisions to be made on priorities and on the most appropriate form of treatment. One exemplary method of determining the potential frequency is to assign a varying degree of probability to each risk/opportunity. FIG. 5 shows an exemplary risk/opportunity table 250 for quantifying the potential frequency of a risk/opportunity occurring. In exemplary table 250, column 251 shows five categories of risk/opportunity frequency, while column 252 shows a qualitative relative measurement of the frequency of each category, for example, very low, low, etc. Column 253 shows a quantitative measurement of the frequency of each category. For example, risk/opportunity category 4 with a qualitative assessment of high has a 40-60% probability of occurring within the given time period. The use of this information will be described in greater detail below.

Quantifying the impact of the risk/opportunity to determine potential severity/advantage may include assigning a monetary value to the risk/opportunity were the eventuality to occur. Those skilled in the art will understand that there are many methods of assigning monetary values to different risks/opportunities. One manner of assigning a monetary value may be based on the EBIT (earnings before interest and taxes). For example, if there was a risk associated with the procurement of raw material that would result in the loss of a $1,000,000 order, such a risk/opportunity may be quantified as a $100,000 risk based on the projected net profit from the order. Whereas, other risks/opportunities may not be as easy to quantify, methods do exist to quantify their value. For example, strategic or industry alliances may be an important opportunity for a corporation in an industry that has high barriers to introduction of new products. Such strategic alliances may allow the corporation to reduce manufacturing costs and create options for future development of product lines. Such strategic alliance opportunities may be quantified based on operating cost savings or market share gains based on being the first to market with a product. The severity/advantage of the risk/opportunity may then be multiplied by the probability that risk/opportunity will occur to arrive at a quantified relative measurement of the risk/opportunity versus other risks/opportunities. Following through with the example started above, if the $100,000 risk had a high probability (40-60%) of occurring, the quantified risk would be a $40,000-$60,000 risk. The risk-return relationship of this risk can then be evaluated against other risks so that the risks can be prioritized to allocate and focus limited risk handling resources on the most important risks. Returning to FIG. 3, the process then continues to step 170 where risk/opportunity handling occurs. Risk/opportunity handling is the use of cost-efficient measures and mechanisms to reduce the potential impact of the risk should it occur and/or to reduce the expected frequency of its occurrence and to maximize the potential impact of an opportunity should it arise and/or to increase the expected frequency of its occurrence. Similarly, if it is a opportunity, the goal is to exploit the potential impact of the opportunity and/or increase the expected frequency of its occurrence. Some of the potential options include risk avoidance which is the withdrawal from the activity where additional risk/opportunity handling is not cost effective and the returns are unattractive in relation to the risks faced. For example, the $40,000-$60,000 risk described above may be unattractive compared to the potential reward of only $100,000 when compared to the risk. Another option may be activities and measures designed to reduce the probability of negative occurrences and/or minimize the severity of its impact should it occur. Some examples of these actions include hedging, loss prevention, crisis management, business continuity planning, and quality management. Once again, using the exemplary risk described above, it may be possible to arrange for a contingent supplier of raw materials at a slightly higher price were the risk of the first supplier failing to supply the raw material to occur. If such an arrangement can be made, it may reduce the expected impact of the risk, and therefore be more attractive to enter into supply contract.

Other options may include risk transfer which are activities and measures designed to transfer to a third party the responsibility for managing risk or liability for the financial consequence of a risk should it occur. The most common examples of risk transfer are the purchasing of insurance and subcontracting out a specific activity while obtaining indemnification from the subcontractor. Finally, there is risk acceptance where the additional risk handling may not be cost effective, but the potential returns are attractive in relation to the risks faced. Once again, returning to the example above, the return of $100,000 on a $40,000-$60,000 risk may not be attractive, however, there may be a potential opportunity for follow-on contracts having a total value of $10,000,000. In this case, the potential opportunity for a higher return may be attractive in relation to the risk and the risk will be accepted.

Before performing risk/opportunity handling step 170, the risks/opportunities may be prioritized based on the evaluations performed in risk/opportunity evaluation step 160. However, after risk/opportunity handling step 170, the risks/opportunities may be re-prioritized because of the risk/opportunity handling measures applied during this step. This re-ordering of the risks/opportunities may then be used to determine whether a risk position is acceptable or whether certain steps necessary to prepare for a potential opportunity are justified and may be used to determine which risk/opportunity handling procedures will have the greatest influence on the expected outcome. For example, it may be determined that the risk/opportunity handling option of risk transfer offers the greatest benefit to the corporation because the net risk of each of the risks/opportunities that this approach was used on has the greatest decrease in quantitative risk after risk/opportunity handling step 170.

The process then continues to step 180 for risk/opportunity control which includes risk/opportunity reporting and monitoring. Key risks and opportunities including the risk/opportunity handling measures are reported. This supports the availability of relevant risk/opportunity information at all levels of the organization and ensures the adequacy of the risk/opportunity handling. This monitoring and control aids in the timely notification of fundamental changes in risks and/or opportunities and identifies new threats or opportunities presented to the corporation. Additionally, the monitoring and reporting evaluates the viability of risk/opportunity handling methods used in step 170 and identifies any problems or possible enhancements to these methods. Finally, the reporting step allows for the evaluation of the risk/opportunity management process and risk/opportunity management system as a whole to ensure the continued suitability and robustness of the system.

There are measures and indicators which can be used to illustrate certain risk/opportunity situations and/or the suitability of risk/opportunity handling measures. For example, in the area of information technology (IT) risks, there may be a risk that the information technology systems, e.g., computer network, will become unavailable for use. In step 170 there may be risk/opportunity handling measures employed to minimize this risk. The measured actual percentage of availability of the IT systems is then used to determine if the risk/opportunity handling measures were adequate or are in need of enhancement. Another example in the area of financial risks may be that customers will not pay in a timely fashion. Once again, in step 170 there may be risk/opportunity handling measures employed to minimize this risk. The actual amount of overdue receivables is then used to determine if the risk/opportunity handling measures were adequate or if additional measures need to be implemented. As described above, the same procedures may also be applied to opportunities and to measure the adequacy of opportunity handling measures. For example, in the general business opportunity area, a certain quantified value of business opportunity in the form of possible gain in market share may be identified in step 150. This opportunity may then be evaluated and handled in steps 160 and 170. Then, it is possible to measure the actual gain in market share to evaluate the adequacy of the opportunity handling measures. Other exemplary measures and indicators that may be used to judge the adequacy of risk/opportunity handling measures may be business volume, first pass yield of production, planning accuracy, currency volatility, number of IT support inquiries, average frequency of re-tendering, average delivery lead time, percentage of purchasing volumes with dominant suppliers, legal claims and notifications, regulatory investigations, staff satisfaction, staff turnover, and average time of sick leave. The process then reverts back to step 150 and remains a continuous process within the organizations management scheme.

Figure 8:
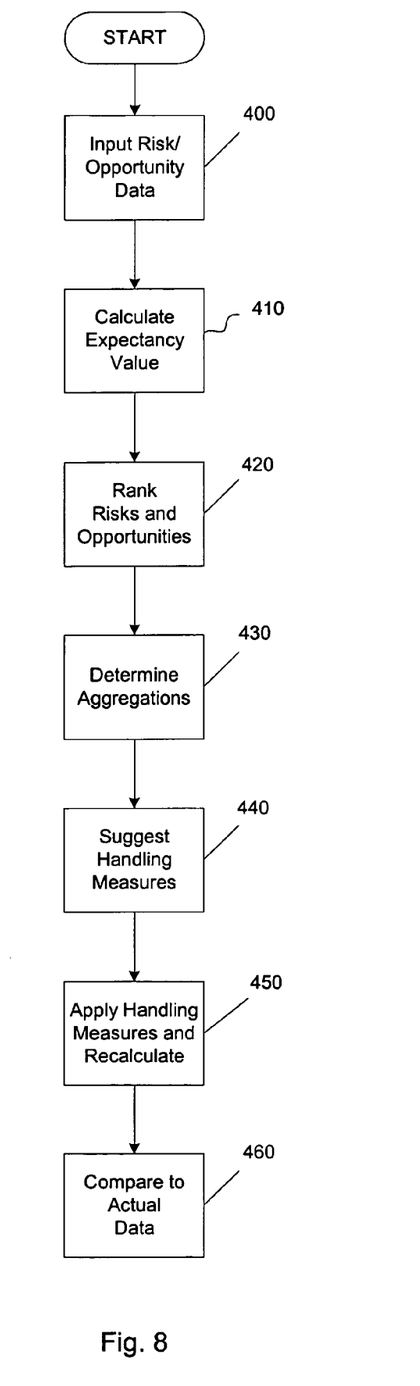
FIG. 8 shows an exemplary process flow for the automation of an exemplary risk/opportunity management process.

It may be possible to automate portions of the risk/opportunity management process. FIG. 8 shows an exemplary process flow chart for the automation of portions of evaluation step 160, risk/opportunity handling step 170 and risk/opportunity controlling step 180 of the exemplary risk/opportunity management process described with respect to FIG. 3. A risk/opportunity analysis generator (ROA generator) may be a computer based tool designed to compile and analyze risk and opportunity related input. In step 400, the responsible individual may input data into the ROA generator after identifying a risk or opportunity in step 150 of FIG. 3 through the use of, for example a checklist. The data may be, for example, a description of a particular risk/opportunity, the EBIT impact of the potential risk/opportunity and the potential frequency of the risk/opportunity occurring. Those skilled in the art will understand that the ROA generator may also include a pre-stored set of risks and opportunities, along with or separate from quantified values, for example an EBIT, and potential frequencies. This pre-stored data may be compiled based on the corporation's knowledge and experience base with well known risks/opportunities and their impact on the business. Such a knowledge base also allows responsible individuals throughout the corporation to share information and input consistent data into the overall risk/opportunity management process. Furthermore, it allows responsible individuals to gain an understanding of the scope and breadth of risk and opportunity as it is seen by other responsible individuals throughout the corporation.

In step 410, the ROA generator may then multiply the EBIT by the potential frequency to determine an expectancy value of the risk or opportunity. The ROA generator in step 420 may then rank the risks and opportunities based on the expectancy values to determine the relative importance of each risk and opportunity. As part of the ranking of risks and opportunities, the ROA generator may, for example, set thresholds for risk/opportunity handling methods. For example, all risks below a certain expectancy value may be eliminated because the continued cost of handling these risks may be greater than the actual impact to the corporation. Therefore each of these risks may be accepted and no further handling will be needed. Similarly, there may be a very high threshold value where all risks are avoided, or at least flagged to be immediately reported to senior management before further handling costs are incurred, because the risk is so great that it could be a threat to the existence of the corporation. Similarly, opportunities above a certain threshold value may be flagged for immediate reporting to senior management to determine how best to take advantage of the opportunity. Those skilled in the art will understand that there are numerous other thresholds that may be set to signal a certain action be taken with respect to an individual risk or opportunity. In step 430, the ROA generator may determine where risks and opportunities are aggregating. For example, the ROA generator may determine that there are numerous risks/opportunities aggregating in one particular product line or that there are risks/opportunities aggregating with one supplier. The ROA generator may flag such aggregation points of risk or opportunity so that appropriate strategies for dealing with these risks or opportunities may be formulated.

The process then continues to step 440 where the ROA generator may suggest risk/opportunity handling measures for individual risks/opportunities. Once again, the ROA generator may draw upon the knowledge base of the corporation in dealing with similar risks/opportunities in the past. For example, if one product line has successfully handled a particular risk or opportunity in the past, when such a risk or opportunity appears for a second product line, the ROA generator may suggest the particular risk/opportunity handling measure that had previously proved successful. Similarly, the ROA generator may flag risk/opportunity handling measures that were unsuccessful in the past. Suggestions such as these foster a common understanding of risk and opportunity which supports the corporation in its efforts to consistently apply common handling measures for risk and opportunity. In step 450, the ROA generator may apply the risk/opportunity handling measure selected by the responsible individual and recalculate the expectancy value of the risk/opportunity based on risk/opportunity handling measure. For example, if there was a $1,000,000 risk that was dealt with by using a risk transfer measure in the form of purchasing insurance having a $50,000 deductible, the ROA generator may recalculate the expectancy value to be $50,000 times the potential frequency. Likewise, other risks and opportunities where risk/opportunity handling measures have been applied may have their expectancy values recalculated and ranked. Again, the ROA generator may include a knowledge base of quantified risk/opportunity handling measure's effects on the expectancy values of certain risks/opportunities. The new rankings, in addition to showing the relative importance of each risk and opportunity, may also yield information on the risk/opportunity handling measures that are expected to yield the greatest benefit.

The process then continues to step 460 where the actual operating experiences of the corporation may be input into the ROA generator. This actual data may then be used by the ROA generator to compare to the expectancy values of each of the risks and opportunities to determine the efficiency of the risk/opportunity management system. Such comparison may yield a wealth of information on the expectancy values of risks/opportunities, the frequency with which certain risks/opportunities actually occur and which risk/opportunity handling measures are most effective. These results may also be used for reporting purposes and to judge the overall efficiency of the risk/opportunity management system.

Risk/Opportunity Culture and Communication: The effectiveness of every risk/opportunity management measure depends on effective implementation of the risk/opportunity management scheme by corporate employees. Corporate management in promoting the risk/opportunity policies must effectively stress the importance of risk and opportunity awareness and the understanding of risk/opportunity situations within the corporation. Factors which promote such a risk/opportunity aware culture include, for example, a corporate philosophy and management style that factor in risk/opportunity management into corporate decision making, a trust in the competence and abilities of employees to recognize risk and opportunity and effective horizontal and vertical communication.

Communication is an important factor in an effective risk/opportunity management system. Factors which promote efficient communication within a corporation include a common risk/opportunity language enabling all parties involved in risk/opportunity management to communicate clearly and on a consistent basis. Risk/opportunity management organization 90, as described with respect to FIG. 2a, may promote a common risk/opportunity language by providing glossaries and reviewing the specific policies of each individual group to ensure that consistent terminology is used. Another factor in effective communication is a prompt transmission of risk and opportunity situations along both horizontal and vertical channels to enable timely decision making. This can be encouraged by ensuring that communication of bad news is not punished but rather taken as an opportunity for constructive development. Finally, a free exchange of information across hierarchical and geographic barriers ensures that the corporation effectively uses the accumulated knowledge and experience of all participants in the risk/opportunity management system. Once again, risk/opportunity management organization 90 may be instrumental in reporting unique risk/opportunity management solutions or risk/opportunity management problems throughout the corporation.

Figure 6:
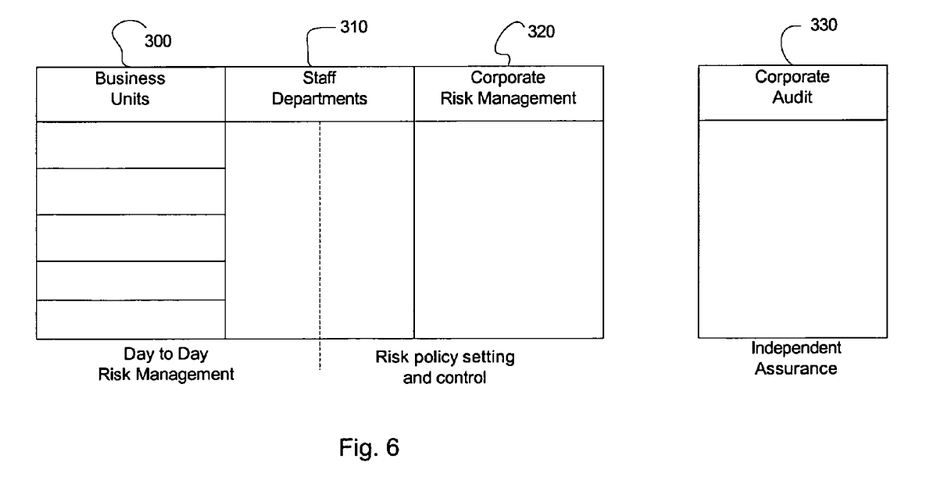
FIG. 6 shows an exemplary embodiment of a risk/opportunity management system.

Second Embodiment: FIG. 6 shows another exemplary embodiment of a risk/opportunity management system having a three pillar approach. The first pillar consists of business units 300 in charge of and responsible for risk/opportunity management within the framework of each of their business responsibilities. The second pillar includes staff departments 310 and corporate risk/opportunity management department 320 that support business units 300 and have responsibility for risk/opportunity policy setting, risk/opportunity oversight and for developing tools and standards for the implementation of risk/opportunity management. As will be described in greater detail below, staff departments 310 may also have some responsibilities in the day-to-day management of risk/opportunity within a business unit. The third pillar is corporate audit department 330 which is responsible for providing independent assurance as to the implementation and effectiveness of the risk/opportunity management system. The roles and responsibilities of each of these departments will be described in greater detail below.

Business units 300 are responsible for the ongoing identification and evaluation of risks/opportunities within the business and selecting and implementing risk/opportunity management measures on a day-to-day basis. Business units 300 may be responsible for the entire risk/opportunity management process, for example, the exemplary risk/opportunity management process described with respect to FIG. 3. In addition to the risk/opportunity identification and evaluation, this may include reviewing the effectiveness, efficiency and suitability of the risk/opportunity management process and maintaining efficient and cost effective risk/opportunity handling mechanisms. Keeping these functions in business units 300 allows for a rapid response to the changing business environment because each of individual business units 300 is closest to its particular business. Business units 300 may also be responsible for reporting functions, including the regular reporting of key risks and opportunities, regular reporting of risk/opportunity handling measures and the reporting of significant breakdowns in risk/opportunity handling measures to prevent a recurrence in that business unit and other business units throughout the corporation. Business units 300 may also manage certain risks/opportunities through the use of facilities and services provided by staff departments 310. For example, accounts receivable risks for business units 300 may be handled by the treasury department which is a staff department 310.

Staff departments 310 may play a risk/opportunity management role at both the corporate level and at a business unit level. To the extent that staff departments 310 have responsibilities for day-to-day risk/opportunity management functions, their responsibilities may be coextensive with business units 300. Staff departments 310 may assign risk/opportunity management specialists to individual business units 300 to handle particular risks/opportunities according to their specialities. However, the main focus of staff departments 310 is at the system level rather than at the operational level where business units 300 operate. Each of staff departments 310 may be assigned a specific risk/opportunity area with appropriately trained individuals for the assigned risk/opportunity area. For example, one staff department may specialize in financial risks/opportunities, while another specializes in purchasing risks/opportunities. The manner in which a corporation categorizes its risks/opportunities, for example, cause, event, etc., should assist in illustrating corresponding areas of activities of staff departments 310 within the risk/opportunity management system. Staff departments 310 may be responsible for preparing risk/opportunity policies for their risk/opportunity areas in line with the corporate risk/opportunity policy. Furthermore, staff departments 310 may be responsible for developing guidelines and methodologies to assist business units 300 in implementing the risk/opportunity management system. For example, a staff department specializing in financial risks/opportunities may prepare generic guidelines for the identification, evaluation, management, reporting and monitoring of financial risks/opportunities. Each of business units 300 may then integrate these generic financial risk/opportunity guidelines into its overall program to implement a risk/opportunity management system tailored for their business. In addition to providing policy direction, staff departments 310 may also offer advice in relation to their specific risk/opportunity area and provide other assistance to business units 300.

Training of business units 300 to be aware of risks and opportunities in specialized risk/opportunity areas may also be a function of staff departments 310. Once again, open communication between staff departments 310 and business units 300, along with communication lines to the other pillars of the risk/opportunity management system, corporate risk/opportunity management department 320 and corporate audit 330 should be fostered to create a corporate culture fully ingrained in risk/opportunity management. Those skilled in the art will understand that there should be open lines of communication between all the pillars of the exemplary risk/opportunity management system of FIG. 6. Finally, staff department 310 may also have a monitoring responsibility for each of business units 300 to ensure adherence to the corporate risk/opportunity policy and guidelines.

The aim of corporate risk/opportunity management 320 is to develop and promote a value enhancing risk/opportunity culture in a constantly changing commercial environment.

This includes the promulgation and promotion of risk/opportunity awareness, the development of a comprehensive risk/opportunity management system and providing business units 300 and staff departments 310 with the tools necessary for accomplishing these goals. The responsibilities of corporate risk/opportunity management 320 may include the preparation and implementation of a corporate risk/opportunity management policy throughout the corporation, the designation of risk/opportunity responsibilities, and the development of common risk/opportunity management standards. Corporate risk/opportunity management 320 may also analyze the assessments of risks and opportunities, as well as the risk/opportunity handling measures developed by business units 300 while identifying major interdependencies and areas of risk and opportunity accumulation. For example, corporate risk/opportunity management 320 may determine that two or more business units 300 have interdependencies because of overlapping or complimentary product lines. For example, a first business unit may sell a particular integrated circuit product line, while a second business unit may sell printed circuit boards on which the integrated circuit product line of the first is placed. Corporate risk/opportunity management 320 should recognize such interdependencies and account for this in the corporate decision making process. Similarly, when a single supplier provides raw materials to multiple business units 300, corporate risk/opportunity management 320 should recognize that there is an accumulation of risk/opportunity in this one supplier, whereas, individual business units 300 may not be able to make the connection because they are not aware of suppliers relations with other business units 300. This same manner of recognition also applies to opportunities. For example, a first business unit may have a particular customer which would be a natural fit for a second business unit. Corporate risk/opportunity management 320 may have the responsibility for making connections such as this.

To make these connections and recognize interdependencies, corporate risk/opportunity management 320 may prepare comprehensive risk and opportunity reports based on the reports coming in from individual business units 300 and staff departments 310. As described above, business units 300 may be responsible for the complete spectrum of risk and opportunity management for their businesses which may include the quantification of risk and opportunity as described previously. These reports may form the basis on which corporate risk/opportunity management 320 prepare comprehensive risk and opportunity reports for the entire corporation. Finally, corporate risk/opportunity management 320 may provide ongoing generic risk/opportunity management training including the sharing of risk/opportunity management knowledge and best practices, and the identification of risk transfer strategies in accordance with established risk retention levels.

Corporate audit 330 provides independent assurance of the risk/opportunity management system and the processes supporting it. Its role within the risk/opportunity management system is to review the overall effectiveness, efficiency and suitability of the risk/opportunity management process at the system level. Corporate audit 330 may also be responsible for testing compliance with the risk/opportunity management framework at all levels and identifying the potential impact of weaknesses of the risk/opportunity management system. It may also include making spot checks of the risk/opportunity evaluation and the suitability of risk/opportunity management measures employed by business units 300.

As described above, business units 300 perform all the steps of the exemplary risk/opportunity management process described with respect to FIG. 3. This risk/opportunity management process employed by business units 300 may be considered an operative risk/opportunity management process. This operative risk/opportunity management process should be designed to identify, evaluate, handle and monitor the day-to-day risks/opportunities of business units 300 by implementing the risk/opportunity management system and tools. The corporate risk/opportunity management process implemented by corporate risk/opportunity management 320 may use the same steps as the operative risk/opportunity management process. However, the purpose of the corporate risk/opportunity management process is to ensure a common corporate approach toward risk/opportunity identification, evaluation, handling and monitoring and that all relevant information concerning risks/opportunities is available at the corporate level.

In the exemplary risk/opportunity management system illustrated in FIG. 6, monitoring and reporting is an important responsibility shared by all groups within the system. For example, each business unit 300 may be responsible for monitoring and reporting risks/opportunities and risk/opportunity handling measures and the development and implementation of risk/opportunity management action plans for its business. Staff departments 310 may be responsible for monitoring and reporting adherence to the risk/opportunity policy and guidelines set for their specific risk/opportunity area. Corporate risk/opportunity management 320 may be responsible for the monitoring and reporting of the overall risk/opportunity management system, including the changes resulting from business trends, while corporate audit 330 may be responsible for monitoring and reporting the adequacy and effectiveness of the risk/opportunity management system.

In the preceding specification, the present invention has been described with reference to specific exemplary embodiments thereof. It will, however, be evident that various modifications and changes may be made hereunto without departing from the broadest spirit and scope of the present invention as set forth in the claims that follow. The specification and drawings are accordingly to be regarded in an illustrative rather than restrictive sense.

What is claimed is:

1. A system, comprising:
    a first storage means for receiving and storing data at predetermined times, wherein the data corresponds a plurality of risks and a plurality of opportunities for the business entity;
    a second storage means for receiving and storing data at each of the predetermined times, wherein the data corresponds to a potential monetary impact on the future condition of the business entity of each of the risks and opportunities stored in the first storage means;
    a first input means for receiving at each of the predetermined times, for each opportunity stored in the first storage means, data corresponding to one of a probability that the opportunity will occur during a predetermined period of time and a frequency at which the opportunity will occur,
    a second input means for receiving at each of the predetermined times, for each risk stored in the first storage means, data corresponding to one of a probability that the risk will occur during a predetermined period of time and a frequency at which the risk will occur, and
    a calculation means for projecting at each of the predetermined times the future condition of the business entity based on a monetary value of each of the risks and opportunities stored in the first storage means, wherein the monetary value is a function of the potential monetary impact and the one of frequency and probability for each of the risks and opportunities from the first and second input means;

wherein the potential monetary impact is a function of one of earnings before interest and taxes ("EBIT"), operating cost savings and market share gains.

2. The system according to claim 1, wherein the calculation means projects the monetary value for the future condition of the business entity based on a multiplication of the potential monetary impact of each of the risks and opportunities stored in the first storage means by the corresponding one of frequency and probability.

3. The system according to claim 2, wherein risks having monetary values below a threshold are accepted.

4. The software system according to claim 1, further comprising:

a handling means for including risk handling measures to decrease the probability that at least one risk will occur.

5. The system according to claim 1, further comprising:

an assessment means for determining if at least two risks affect one future condition.

6. A computer-readable storage medium storing a set of instructions, the set of instructions capable of being executed by a processor to project a future condition of a business entity, the set of instructions performing the steps of:

identifying a plurality of risks and a plurality of opportunities for the business entity;

evaluating at predetermined times a potential monetary impact of each of the risks and each of the opportunities on the future condition of the business entity;

determining at each of the predetermined times for each of the risks, one of a probability that the risk will occur during a predetermined period of time and a frequency at which the risk will occur;

determining at each of the predetermined times for each of the opportunities, one of a probability that the opportunity will occur during a predetermined period of time and a frequency at which the opportunity will occur;

projecting at each of the predetermined times the future condition of the business entity based on a monetary value of each of the risks and opportunities, wherein the monetary value for each of the risks and opportunities is determined based on the potential monetary impact and the corresponding one of frequency and probability;

and wherein the potential monetary impact is a function of one of earnings before interest and taxes ("EBIT"), operating cost savings and market share gains.

7. The computer-readable storage medium according to claim 6, wherein the monetary value is determined by a multiplication of the potential monetary impact by the corresponding one of frequency and probability.

8. The computer-readable storage medium according to claim 7, wherein the set of instructions performs the step of:

ranking each risk based on a result of the multiplication of the potential monetary impact of each risk by the corresponding one of frequency and probability for the risk.

9. The computer-readable storage medium according to claim 6, wherein the set of instructions performs the step of:

reporting each of the risks and opportunities to management of the business entity.

10. The computer-readable storage medium according to claim 6, wherein the set of instructions performs the steps of:

handling at least one of the risks to decrease the probability that the at least one risk will occur; and handling at least one of the opportunities to increase the probability that the at least one opportunity will occur.

11. The computer-readable storage medium according to claim 6, wherein one of a checklist and a questionnaire identifies one of the risks and the opportunities.

12. The computer-readable storage medium according to claim 6, wherein the set of instructions performs the step of:

identifying a root cause for one of the risks and the opportunities.

13. The computer-readable storage medium according to claim 6, wherein the predetermined times include one of a month and a week.

14. The computer-readable storage medium according to claim 6, wherein the set of instructions performs the step of:

comparing a previously projected future condition to an actual condition at a time corresponding to the previously projected future condition to determine an accuracy of the projected future condition.

* * * * *

UNITED STATES PATENT AND TRADEMARK OFFICE
CERTIFICATE OF CORRECTION

| | | |
|---|---|---|
| PATENT NO. | : 7,305,351 B1 | Page 1 of 1 |
| APPLICATION NO. | : 09/680923 | |
| DATED | : December 4, 2007 | |
| INVENTOR(S) | : Bechhofer et al. | |

It is certified that error appears in the above-identified patent and that said Letters Patent is hereby corrected as shown below:

Column 16, Line 47, claim 1:

"the data corresponds a plurality" should read --the data corresponds to a plurality--

Column 16, Line 65:

"the risk will occur, and a calculation means" should read --the risk will occur; and a calculation means--

Signed and Sealed this

Twentieth Day of May, 2008

JON W. DUDAS
*Director of the United States Patent and Trademark Office*